US008245252B2

(12) United States Patent
Gee et al.

(10) Patent No.: US 8,245,252 B2
(45) Date of Patent: Aug. 14, 2012

(54) SYSTEM, METHOD, AND COMPUTER PROGRAM PRODUCT FOR SELECTIVE REPLACEMENT OF OBJECTIONABLE PROGRAM CONTENT WITH LESS-OBJECTIONABLE CONTENT

(75) Inventors: Jeanette Gee, Chattanooga, TN (US); Gary Robson, Belfry, MT (US); James D. Gee, Jr., Chattanooga, TN (US)

(73) Assignee: Caption TV, Inc. (CA)

( * ) Notice: Subject to any disclaimer, the term of this patent is extended or adjusted under 35 U.S.C. 154(b) by 1462 days.

(21) Appl. No.: 10/658,344

(22) Filed: Sep. 9, 2003

(65) Prior Publication Data

US 2004/0049780 A1 Mar. 11, 2004

Related U.S. Application Data

(60) Provisional application No. 60/409,270, filed on Sep. 10, 2002.

(51) Int. Cl.
*H04N 7/10* (2006.01)
*H04N 7/025* (2006.01)

(52) U.S. Cl. .................. 725/36; 725/20; 725/28
(58) Field of Classification Search .................. 725/20, 725/28, 36
See application file for complete search history.

(56) References Cited

U.S. PATENT DOCUMENTS

| | | | | |
|---|---|---|---|---|
| 5,610,653 | A * | 3/1997 | Abecassis | 348/170 |
| 6,501,515 | B1 * | 12/2002 | Iwamura | 348/734 |
| 6,519,770 | B2 * | 2/2003 | Ford | 725/28 |
| 6,675,384 | B1 * | 1/2004 | Block et al. | 725/28 |
| 7,370,343 | B1 * | 5/2008 | Ellis | 725/58 |
| 2002/0108111 | A1 * | 8/2002 | Cezeaux et al. | 725/39 |
| 2003/0046690 | A1 * | 3/2003 | Miller | 725/36 |
| 2003/0078972 | A1 * | 4/2003 | Tapissier et al. | 709/204 |
| 2007/0201694 | A1 * | 8/2007 | Bolle et al. | 380/205 |

OTHER PUBLICATIONS

Kenneth M. Chanko, "No-Fuss No-Cuss Movie Cleanup", Entertainment Weekly, #453, Oct. 9, 1998.
Harry Somerfield, "'V-Chip' for TV Will Filter Language Unfit for Children", San Francisco, CA, Chronicle, Dec. 2, 1998, San Francisco-Oakland-San Jose Metropolitan Area, CA, USA.

(Continued)

*Primary Examiner* — Pankaj Kumar
*Assistant Examiner* — Charles N Hicks
(74) *Attorney, Agent, or Firm* — Katten Muchin Rosenman LLP

(57) ABSTRACT

A system, method, and computer program product is provided for the selective replacement of objectionable content in a program with less-objectionable material. The selective replacement of objectionable content in a program with less-objectionable material is accomplished by applying an encoding process and a decoding process to the audio and/or video signal of the program. The encoding process includes marking potentially objectionable material in the program with replacement information that identifies the type (e.g., audio, violent content, sexual content, etc.) and intensity level (e.g., mild, graphic, extreme, etc.) of the potentially objectionable material using replacement codes. The decoding process includes comparing, during the presentation of the program to the user and prior to outputting the audio or displaying the video, the replacement information to a replacement criterion, which includes user supplied replacement settings, to determine whether replacement of the potentially objectionable content (i.e., audio and/or video) should be performed. If replacement is to be performed, the objectionable content in the program is replaced according to the replacement information which, in the preferred embodiment, identifies the start and duration of the replacement and, for replacement of the video of the program, also identifies the display area of the video to be replaced.

31 Claims, 5 Drawing Sheets

OTHER PUBLICATIONS

Elizabeth Shaw, "New device kicks foul language in the @$!#", Flint, MI Journal, Nov. 22, 1998, Flint, MI, USA.

"Gadget will filter the unpredictable words out of your television programs", St. Louis, MO Post-Dispatch, Dec. 7, 1990, St. Louis, MO, USA.

"TVGuardian (Principle Solutions)", Computing Today, Feb. 1999, Carol Stream, IL, USA.

Mike Snider, "Big ticket is the hot ticket at electronics show", USA Today, Jan. 11, 1999, p. 6D, USA.

User's Manual, TVGuardian, The Foul Language Filter, pp. 1-8, © 2000 Principle Solutions Inc., Rogers, AR, USA.

Evan Ramstad, "TV Guardian Screens the Tube and Filters Out Foul Language", The Wall Street Journal, Technology Journal, Under the Radar, Feb. 18, 1999, p. B6, USA.

Robert Moritz, Dirty-Word Cop, The Gadget Guide Tools for High-Tech Living, Parade magazine.

Brendan O'Reilly, "Parents buying TV censor box to axe bad words", North Little Rock, AK Times, Nov. 26, 1998, pp. 31-32, Little Rock, AK, USA.

Martha Mendoza, "New Electric Gadgets Debut at Show", washingtonpost.com, Jan. 8, 1999.

"How the xxxx did this little box win two awards? And what the xxxx is TVGuardian anyway?", Advertisement, TV Guardian, The Foul Language Filter, Principle Solutions, patent pending.

"We don't mind hearing these four-letter words. Best of Show.", Advertisement, TV Guardian, The Foul Language Filter.

"People swear by TVGuardian. They just can't swear through it.", Advertisement, TV Guardian, The Foul Language Filter, Principle Solutions, patent pending.

* cited by examiner

SYSTEM, METHOD, AND COMPUTER PROGRAM PRODUCT FOR SELECTIVE REPLACEMENT OF OBJECTIONABLE PROGRAM CONTENT WITH LESS-OBJECTIONABLE CONTENT

CROSS REFERENCE TO RELATED APPLICATIONS

This Application claims the benefit of U.S. Provisional Application No. 60/409,270 filed Sep. 10, 2002.

COPYRIGHT NOTIFICATION

Portions of this patent application contain materials that are subject to copyright protection. The copyright owner has no objection to the facsimile reproduction by anyone of the patent document, or the patent disclosure, as it appears in the Patent and Trademark Office.

BACKGROUND OF THE INVENTION

1. Field of the Invention

The present invention relates, generally, to the field of processing of audio and/or video signals, such as for example television broadcasts, movies, and other programs, and, more particularly, to a system, method and computer program for selective replacement of objectionable content in a program with less-objectionable content, such as, e.g. advertisements.

2. Description of the Related Art

It is a common desire of many viewers or listeners of television, movies, music, and other programs to filter portions of the audio and/or video of such programs. For example, many parents prohibit their children from watching cable television broadcasts, certain movies, or other programs because the audio of the program may include inappropriate language or the video may include inappropriate content, such as nudity, sexual content, or violence, that is unsuitable for children. In addition, since the parent has not seen the program, the parent may not know whether the content of the program is inappropriate for the children or not. Consequently, parents may inadvertently permit their children to view a program not knowing portions of it are inappropriate, or conversely, may prohibit viewing of the program even though its content does not include any inappropriate portions.

In an effort to solve this dilemma, the U.S. Federal Communications Commission ("FCC") has established provisions (EIA-608-B) for attaching parental guidelines ("ratings") to broadcasts using any of four different systems (U.S. TV, U.S. MPAA, Canadian English, and Canadian French). According to the FCC guidelines, however, only one rating may be applied to any given program and that rating may not change during the course of the program.

The inability to change the rating midway during the broadcast makes the FCC parental guideline system a "go or no-go" system. In other words, either the entire program is deemed appropriate or inappropriate depending on the rating. Consequently, while the rating system is helpful to parents in determining whether to permit the child to view the entire broadcast or program, it does not facilitate filtering of portions of the program to prevent viewers (e.g., children) from seeing or hearing particular portions of the program that are objectionable.

There are various prior art systems and methods that are based on or rely on the use of a government or industry-wide program rating system, such as the previously discussed rating system, that use a "V-chip" approach, or that use a proprietary rating system. See, for example, U.S. Pat. No. 5,485,518 to Hunter et al. Such systems are effective for filtering audio and/or video content that the user or viewer indicates should be blocked based on such content being associated with a specific rating. The specific ratings, however, are applied to an entire program and, as such, the systems that block audio and/or video content based on such ratings block or allow through the entire program.

These systems are "go or no-go" systems, as discussed above. Either the entire program is deemed appropriate and let through, or inappropriate and blocked depending on the rating. There is no capability in such systems for allowing the user or viewer to watch the program, but to replace objectionable material (audio or video) with less-objectionable material, such as, e.g. advertisements.

Furthermore, many of the various prior art systems that provide for filtering of audio and/or video content require specialized hardware or additional components to perform the replacement function, such as audio-video devices that use dedicated circuitry, components, or chip sets. See, e.g., U.S. Pat. No. 5,828,402 to Collings; U.S. Pat. No. 4,554,584 to Elam; and U.S. Pat. No. 5,387,942 to Lemelson. While these systems are able to block content deemed to be objectionable by the viewer or user, the implementation of the filtering function is dependent on inclusion of the required hardware into the audio-video device. Such necessary hardware increases the cost of such equipment, makes upgrading or updating to improve functionality and/or to add features difficult and, in most cases, impossible, and severely limits widespread adoption and use.

U.S. Pat. No. 6,230,320 to Gakumura discloses a system and method for temporarily releasing viewing restrictions in a television receiver employing a V-chip system. In order for the user to view the blocked program, the user must enter a viewing restriction release command to temporarily release viewing restriction based on the contents of a rating set. This entry results in the viewing restriction based on the contents of the set rating being invalid with the contents of the set rating held when the viewing restriction release command is entered. The program can be reblocked by the user entering a viewing restriction return command to return the viewing restriction, which makes the viewing restriction based on the contents of the set rating valid. While this system provides a temporary way to unblock a previously blocked program, it does not provide the capability of allowing the user or viewer to watch a program, while replacing objectionable material (audio or video) with less-objectionable material, such as, e.g. advertisements.

U.S. Pat. No. 6,075,550 to Lapierre, which is hereby incorporated by reference, discloses a system that filters the closed caption and/or audio of a television program by comparing the words in the transmitted closed caption with a list of offensive words. When an offensive word is detected, the system will remove it from the closed caption stream so that it is not displayed on the television screen. Based on detection of the offensive word in the closed caption stream, the system mutes (i.e., turns off) the audio signal for a timed period.

The system estimates the time at which it should start muting the audio and the length of the timed period. The disclosure indicates that the period of time for which the audio signal is turned off is flexible. A longer period during which the signal is turned off tends to decrease the chance of objectionable material getting through; however, this also tends to filter a greater amount of unobjectionable material. A shorter period during which the signal is turned off tends to have the opposite effect.

The period of time for which the audio signal is turned off may also be a function of the word or phrase encountered. Where a particularly objectionable word, or particular lengthy objectionable phrase is encountered, the audio signal may be turned off for a relatively long period of time.

Similarly, where the word is less objectionable and does not involve a lengthy phrase, the audio signal may be turned off for a relatively short period of time. Thus, the system estimates when in the audio signal the word is likely to appear, based on the arrival of the word in the closed caption stream, to determine when, and for how long, to mute the audio. While the system is effective in filtering offensive words from the closed caption stream, filtering of the audio signal is based on an estimate and may result in audio that is not objectionable being blocked or audio that is objectionable getting through. Plus, the system does not provide the capability of replacing objectionable material with less-objectionable material, such as, e.g. advertisements.

Further, the system does not address objectionable content that may be present in the video signal. See also U.S. Pat. No. 6,166,780 to Bray.

Thus, notwithstanding the various systems and methods of the prior art, there is a need for a system, method, and computer program product that provides for the selective replacement of objectionable material (audio or video) with less-objectionable material, such as, e.g. advertisements. Further, there is a need for a system, method, and computer program product that provides such selective replacement of objectionable content: (1) that can allow the user or viewer to watch a program, while replacing objectionable material (audio or video) with less-objectionable material, such as, e.g. advertisements; (2) that can mark specific portions of the audio and/or video content of a program as objectionable for selective and precise replacement of the audio and/or video signal; (3) that can identify specific portions of the audio and/or video content of a program as objectionable for selective and precise replacement of the audio and/or video signal; (4) that can ensure that only the objectionable content is replaced with less-objectionable material, such as, e.g. advertisements, and that all non-objectionable content is not replaced and all objectionable content is replaced; (5) that can replace both audio and video content that is objectionable with less-objectionable material, such as, e.g. advertisements; (6) that can mark, identify, and replace objectionable content based on different types and levels of intensity of objectionable material; and (7) that can be implemented in a variety of audio-video devices without requiring any specialized hardware or additional components.

SUMMARY OF THE INVENTION

The primary object of the present invention is to overcome the deficiencies of the prior art described above by providing a system, method, and computer program product that can selectively replace objectionable material (audio or video) with less-objectionable material, such as, e.g. advertisements.

Another key object of the present invention is to provide a system, method, and computer program product than can allow the user or viewer to watch a program, while replacing objectionable material (audio or video) with less-objectionable material, such as, e.g. advertisements.

Still another key object of the present invention is to provide a system, method, and computer program product that can mark specific portions of the audio and/or video content of a program as objectionable for selective and precise replacement of the audio and/or video signal with less-objectionable material, such as, e.g. advertisements.

Yet another key object of the present invention is to provide a system, method, and computer program product that can identify specific portions of the audio and/or video content of a program as objectionable for selective and precise replacement of the audio and/or video signal with less-objectionable material, such as, e.g. advertisements.

Another key object of the present invention is to provide a system, method, and computer program product that can ensure that only the objectionable content is replaced, and that substantially all non-objectionable content is not replaced and substantially all objectionable content is replaced with less-objectionable material, such as, e.g. advertisements.

Still another key object of the present invention is to provide a system, method, and computer program product that can replace both audio and video content that is objectionable with less-objectionable material, such as, e.g. advertisements.

Yet another key object of the present invention is to provide a system, method, and computer program product that can mark, identify, and replace objectionable content based on different types and levels of intensity of objectionable material.

Another key object of the present invention is to provide a system, method, and computer program product that can be implemented in a variety of audio-video devices without requiring any specialized hardware or additional components.

The present invention achieves these objects and others by providing a system, method, and computer program product for the selective replacement of objectionable material (audio or video) with less-objectionable material, such as, e.g. advertisements. The selective replacement objectionable content in a program is accomplished by applying an encoding process and a decoding process to the audio and/or video signal of the program. The encoding process includes marking potentially objectionable material in the program with replacement information that identifies the type (e.g., audio, violent content, sexual content, etc.) and intensity level (e.g., mild, graphic, extreme, etc.) of the potentially objectionable material using replacement codes. The decoding process includes comparing, during the presentation of the program to the user and prior to outputting the audio or displaying the video, the replacement information to a replacement criterion, which may include user supplied replacement settings, to determine whether replacement of the potentially objectionable content (i.e., audio and/or video) with less-objectionable material, such as, e.g. advertisements should be performed. If replacement is to be performed, the objectionable content in the program is replaced according to the replacement information which, in the preferred embodiment, identifies the start and duration of the replacement and, for replacement of the video of the program, also identifies the display area of the video to be replaced.

In a preferred embodiment of the present invention, the program is encoded with replacement information in the form of replacement codes that mark content that is potentially objectionable. In the case of an audio and/or video signal that is a television broadcast signal, for example, the replacement codes are encoded into the vertical blanking interval ("VBI") of the audio and/or video signal.

The encoding process of the present invention is performed using an encoding system that includes a computer system and an encoding device. The encoded program is decoded using a replacement device, which receives and decodes the program. The replacement device includes an extraction device that extracts the replacement codes from the audio and/or video signal. The extracted replacement codes are supplied to a processor that, based on the replacement codes and the user supplied replacement criterion, determines whether the audio and/or video should be replaced.

If replacement of the audio is to be performed, the processor causes an audio replacement device to replace the portion of the audio containing the objectionable content with less-objectionable material, such as, e.g. advertisements. The closed caption corresponding to the portion of the audio containing the objectionable content may also be replaced. If replacement of the video is to be performed, the processor causes a video replacement device to replace a specified area of the video display at a specified frame for a specified duration to thereby replace the objectionable portion of the video of the program with less-objectionable material, such as, e.g. advertisements.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
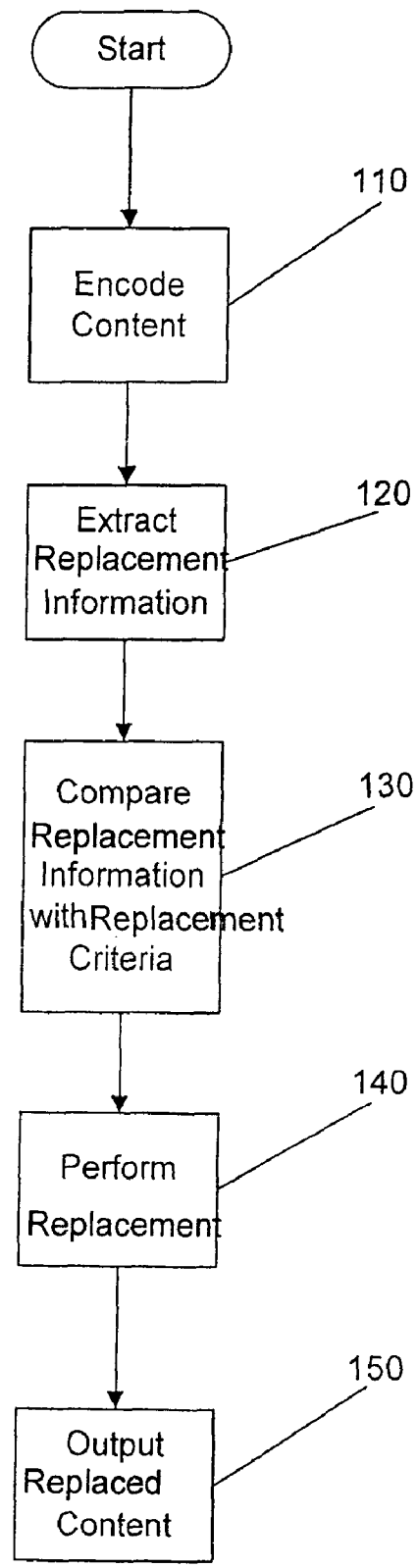
FIG. 1 is a flow diagram representing the method steps for selectively replacing objectionable content in a program with less-objectionable material, such as, e.g. advertisements in accordance with the system, method, and computer program product of the present invention.

In the following description, for purposes of explanation and not limitation, specific details are set forth, such as particular audio-video devices, audio and/or video signals, programs, processors, software, devices, components, circuits, techniques, data protocols, captioning formats, software products and systems, interfaces, hardware, etc. in order to provide a thorough understanding of the present invention. However, it will be apparent to one skilled in the art that the present invention may be practiced in other embodiments that depart from these specific details. Detailed descriptions of well-known audio-video devices, audio and/or video signals, programs, processors, software, devices, components, circuits, techniques, data protocols, captioning formats, software products and systems, interfaces, hardware, etc. are omitted so as not to obscure the description of the present invention.

As used herein, the term "audio-video device" may be intended to refer to any device adapted to receive an audio and/or video signal, including but not limited to, a set-top box (STB), television, video cassette recorder (VCR), digital video recorder (DVR), radio receiver, personal computer, digital video device (DVD), holographic display, or like devices and components.

As used herein, the term "audio and/or video signal" may be intended to refer to a composite audio-video signal, a coded portion of a composite audio-video signal (e.g., closed caption component), a separate audio signal, or a separate video signal. Such signals may be analog signals, digital signals, streaming audio or video signals, broadcast signals, broadband signals, optical signals, circuit- or packet-switched signals, multicast or unicast signals. The audio and/or video signal referred to herein may be delivered to the audio-video device by satellite, by cable, by VHF or UHF broadcast, by radio frequency (RF) transmission, telephone line, optical fiber, or any other wired or wireless means for transmitting an audio and/or video signal. The incoming audio and/or video signal may also be the output from an audio and/or video playback device, such as for example, a DVD player, video cassette recorder (VCR), digital video recorder (DVR), laser disc player, compact disc (CD) player, a holographic memory, or like devices and components.

As used herein, the term "program" and "programming" may be intended to refer to an audio, audio-video, or video presentation such as, for example, a movie, a television program (e.g., a television show, movie, documentary, sporting event, news broadcast, etc.), radio broadcast, or any other broadcast (live or recorded) or recorded production.

Replacement, when used in the context of replacement of the video, means replacing a portion of the video by, for example, replacing the video being displayed on the display screen with less-objectionable material, such as, e.g. advertisements. The advertisement may be, e.g. depiction of a product or service such as, e.g. 'an ACME anti-gravity device', or a commercial advertising a product or service.

Replacement, when used in the context of replacement of the audio, means replacing a portion of the audio by, for example, replacing the audio being displayed on the display screen with less-objectionable material, such as, e.g. advertisements. The advertisement may be, e.g. the name of a product or service such as, e.g. 'ACME skydiving', or a commercial advertising a product or service.

Additional terminology, conventional technologies associated with audio-video devices, audio and/or video signals, programming, and closed captioning, as well as various standards, conventions, and equipment are set forth in "Inside Captioning" by Gary D. Robson, Cyber Dawg Publishing (1997), the contents of which are hereby incorporated herein by reference.

I. Method of the Present Invention

The system, method, and computer program product of the present invention provides for the selective replacement of objectionable content in a program with less-objectionable material, such as, e.g. advertisements. Programming, and the audio and/or video signals representing such programming, that the system, method, and computer program product of the present invention may be employed to replace includes NTSC, PAL, and SECAM video, streaming audio/video, and any other analog or digitally represented programming.

With reference to FIG. 1, a flow diagram representing the method steps for selectively replacing objectionable content in a program with less-objectionable material, such as, e.g. advertisements in accordance with the system, method, and computer program product of the present invention is shown. The method of the present invention may comprise the step 110 of encoding the program to mark potentially objectionable content present in the program. The encoding step 110 may include embedding or inserting replacement information into the program sufficient to identify the potentially objectionable content (video and/or audio) or may include storing or transmitting replacement information, separately from the program, sufficient to identify the potentially objectionable content in the program. As discussed in greater detail below, step 110 may preferably be performed off-line, which involves performing the encoding after production of the program, but prior to its broadcast, playback, etc. Alternatively, the encoding step 110 may be performed in real-time or on-line as the program is being broadcast, played back, etc. The encoding step 110 may be performed by a broadcaster, captioner, production house, post production house, or other entity.

At step 120, the encoded program, which may be received by the audio-video device, may be decoded. The encoded program may be received by the audio-video device in the form of an audio and/or video signal representing the encoded program. The decoding process extracts the encoded replacement information from the audio and/or video signal. As described above, the replacement information may be in the VBI or, alternatively, may be stored in a database or file transmitted separately to the audio-video device, or embedded in another part of the incoming audio and/or video signal for digital signals.

The encoded program is, preferably, received by the replacement device, which decodes the encoded program. The encoded program, however, may be provided to the replacement device through any suitable means such as being supplied on a recorded medium, such as a video cassette, DVD, or CD for playback by a suitable player for decoding.

The extracted replacement information, which includes information identifying potentially objectionable material in the program, may be then compared with the replacement criterion at step 130. The replacement criterion may include information that may be provided by the user, supplied by the manufacturer of the replacement device, and/or periodically supplied by a remote source (e.g., a cable company) and indicates the type and level of potentially objectionable material that is to be replaced in the video as well as the particular words and phrases that are to be replaced in the audio.

If the replacement information does not match the replacement criterion then no replacement is performed. If the replacement information matches the replacement criterion, then the program material may be replaced according to the replacement information at step 140. Thus, the replacement information also includes information sufficient to permit the replacement device to replace the objectionable content with less-objectionable content, such as information sufficient to locate the content (either temporally, spatially, or positionally).

The less-objectionable content may be simply substituted for the objectionable content. The less-objectionable content may be received by the audio-video device in the form of an audio and/or video signal representing the less-objectionable content. The less-objectionable content may, however, be provided to the replacement device through any suitable means such as being supplied on a recorded medium, such as a video cassette, DVD, or CD for playback by a suitable player. A switch, e.g. may be used to switch the input from the stream of objectionable content to that of less-objectionable content.

Finally, the replaced program may then be produced as an output for the immediate presentation to the viewer or for recording or transmission at step 150.

A. Replacement Information of the Present Invention

In one embodiment of the present invention, the replacement information includes any one of three replacement codes, which indicate the type of potentially objectionable material that may be present, as well as information sufficient to selectively and accurately perform replacement of the material.

1. A-Codes (Audio)

Replacement code "A" (A-code or audio code) represents "Audio" and marks (e.g., identifies the placement in the program) a potentially objectionable word or phrase present in the audio portion of the program. As described in more detail below, each A-code consists of a preamble containing the word being identified as potentially objectionable, which permits users to program their replacement device to replace (or not replace) on a word-by-word basis. The A-code also includes a duration, and a start symbol.

2. V-Codes (Violent Content)

Replacement code "V" (V-code or violence code) represents "Violence" and marks potentially objectionable violent material present in the video portion of the program. Each V-code contains information relating to the level of intensity of the violence referred to in this example embodiment as an intensity level. The intensity levels in this example embodiment are:
1—Mild or fantasy violence
2—Graphic violence
3—Extreme violence or rape In addition, each V-code includes information relating to a set of display coordinates to be replaced, a start code, and duration information.

3. S-Codes (Sexual Content)

Replacement code "S" (S-code or sex code) marks potentially objectionable sexual content in the video portion of the program. S-codes and V-codes function nearly identically and are differentiated primarily to allow end users to replace S-codes independently of V-codes, and vice versa. S-codes have intensity levels as follows:
1—Mild nudity (topless, see-through)
2—Full nudity or highly suggestive sexual behavior
3—Graphic sex or strong sexual content The content that may be considered "potentially objectionable" may be defined by the designer and will vary according to the implementation of the present invention. Alternate embodiments may use additional and or different codes to permit other types of replacement. For example, a N-code could be used to identify and replace nudity, but would not identify or replace other sexually explicit content (e.g., kissing). Likewise, an R-code might be used to identify and replace potentially objectionable religious content. Other embodiments might use altogether different replacement codes, replacement information and/or syntax.

4. Replacement Code Syntax

All of the replacement codes share a common syntax, although some of the attributes are not present in all code types. The following replacement code syntax may be used in the encoding and decoding process of the preferred embodiment. The general format is presented below with lowercase words and letters being included as shown, and UPPERCASE words representing the attributes to be inserted by the encoding system.

The format for the codes is as follows:
<replacement:TYPE>[w:WORD][c:CHANNEL][i:INTENSITY][d:DURATION][a:AREA][CHECKSUM][s]

As shown above, the start of the replacement code may be enclosed in angle brackets, and uses the keyword "replacement" to distinguish it from a URL (as described in EIA-608-B §7.10 through 7.14, which will typically begin with http). The "TYPE" portion of the code (following the word "replacement:") will be the letter a, s, or v in this example embodiment. If the two characters after "<replacement:" are anything other than "a>", "s>", or "v>", then the replacement code may be discarded.

Following the end bracket ">" is a list of attributes associated with the replacement type. All of the attributes shown above except channel and word are required for S-codes and V-codes. All except intensity and area are required for A-codes.

a. WORD Attribute

The WORD attribute may be used for A-codes only and identifies the actual word being marked for potential replacement, rendered in all uppercase. If the word being inserted in the WORD attribute contains accent marks, they are stripped out in the capitalization process prior to insertion, which renders the use of extended characters unnecessary.

Since many televisions and decoders (i.e., set top cable boxes) allow viewers to see Text2 data, it may be preferable to prevent the word being replaced from appearing in plain text. Therefore, in the preferred embodiment the word or phrase may be encoded prior to being inserting as an attribute.

In this embodiment the word may be encoded using a simple ROT-13 code as may be well-known in the art. In ROT-13 encoding, each alphabetic character may be replaced by the character that follows 13 positions later—wrapping around if necessary. "A" becomes "N", "B" becomes "O", and so forth. Non-alphabetic characters are not modified. The word being encoded may not include a right square bracket character ("]"), but may contain other non-alphabetic characters such as numbers, apostrophes, and other punctuation marks.

ROT-13 encoding may be used because it may be self-reversing (applying ROT-13 again brings back the original plaintext), easy to encode, fast executing, and adequately obscures the text. However, any suitable encoding method would suffice. The following Visual Basic routine provides an example of a ROT-13 encoding software routine:

```
Private Function Rot13(In Text As String) As String
    Dim i As Integer
    Dim OutText As String
    Dim ThisChar As Integer
        InText = UCase(In Text)    ' Change to all uppercase
    OutText = ""
    For i = 1 To Len(InText)    ' Loop through input text
        ThisChar = Asc(Mid(InText, i, 1))
        If (ThisChar >= Asc("A")) And (ThisChar <= Asc("Z")) Then
```

-continued

```
            ' It's an alphabetic character - rotate it
            If ThisChar < Asc("N") Then
                OutText = OutText & Chr(ThisChar + 13)
            Else
                OutText = OutText & Chr(ThisChar - 13)
            End If
        Else
            ' It's non-alphabetic - include as-is
            OutText = OutText & Chr(ThisChar)
        End If
    Next i
        Rot13 = OutText
End Function
``` b. CHANNEL Attribute

This CHANNEL attribute may be used only for A-codes. NTSC television as used in North America allows for a primary audio program and a second audio program (SAP), which can be another language or a descriptive audio channel for blind viewers. To indicate that the word may be present in the primary audio, the channel attribute may be represented as a "P" (for example [c:P]) or the attribute may be omitted entirely with the default being the primary audio. Conversely, to indicate that the word may be present in the secondary audio program the attribute may be set to "S" ([c:S]).

c. INTENSITY Attribute

The INTENSITY attribute may be used with V-codes and S-codes only and represents the level of intensity of the violent or sexual content in the program, as described above. The attribute value may be specified as a single digit (e.g., [i:2] representing level 2 violent content or sexual content).

The valid range of intensities may be 1-3. Level 0 is not used and the replacement device interprets it as equivalent to omitting the replacement code entirely.

If the replacement device receives a replacement code with an intensity attribute greater than 3, it treats the replacement code as a level 3 intensity. If the replacement device receives an INTENSITY attribute that is not a valid positive integer, it ignores the replacement code entirely and performs no replacement. For example:

[i:0] Ignored;
[i:329] Treated as level 3;
[i:−1] Ignored;
[i:two] Ignored.

d. DURATION Attribute

The DURATION attribute, which may be required for all codes, specifies the number of frames (or alternately, thirtieths of a second) of the program which are to be replaced from the reception of the START attribute (discussed below). In the case of A-codes, it specifies how long the audio will be replaced. For V-codes and S-codes, the DURATION attribute specifies how long a portion of the screen will be replaced. The valid range of the DURATION attribute may be 1 to 300 frames (⅒ second to ten seconds). If replacement of more than ten seconds is required, a second replacement code must be used. This puts a maximum limit on the amount of programming that will be replaced by an erroneous or poorly-coded replacement code.

If a replacement device receives a replacement code with a DURATION attribute greater than three hundred frames, it treats the replacement code as having a three hundred frame DURATION. If it receives a DURATION attribute that is not a valid positive integer, it ignores the replacement code entirely and does not perform any replacement.

In this embodiment, the DURATION attribute identifies the number of frames from the frame in which the start signal may be found. However, in alternate embodiments the DURATION attribute could identify an absolute stop time, a relative stop time, a duration time, or a stop location within the signal or recording.

e. AREA Attribute

The AREA attribute may be used in V-codes and S-codes only and specifies the television display coordinates of the area to be replaced. The format used may be [a:x1,y1–x2,y2]. The upper left corner of the screen may be coordinate 0,0 and the lower right may be 99,99. The AREA attribute may always be expressed so that x1 may be less than x2 and y1 may be less than y2. As an example, to block coordinates (10,20) to (40,60), the attribute would read [a:10,20-40,60].

The coordinates are relative to the full video picture in this example embodiment and not just the viewable area or safe title area. Because of the way televisions are designed and manufactured, the edges of the picture are not visible on all televisions. Consequently, all calculations of the AREA attribute are measured from the actual edges of the transmitted video.

Different implementations of replacement devices of the present invention may use different methods for generating the replacement area. Some implementations may use the caption decoding chip to generate a background while others may use an on-screen display (OSD) chip. Still others may use custom circuitry.

This means that replacement devices may be constrained to different coordinate systems depending on how the replacement rectangle is generated. For example, caption decoder chips often may not be capable of on-screen graphics (for replacement) close to the edge of the screen.

This also means that the video safe area and safe title area will vary between replacement devices. An OSD chip, for example, may be able to generate on-screen graphics considerably closer to the edge of the picture than a decoder chip.

If the replacement device receives an AREA attribute that goes outside of the area that it can block, then it may be possible that objectionable material may be visible around the outside edge of the picture. If the replacement device has the ability to generate a complete screen, it does so instead of generating an obscuring rectangle whenever this situation arises. In other words, if the AREA attribute includes screen area outside the portion of the screen that the replacement device can block, the replacement device blocks the video signal in its entirety. This ensures that everything that is supposed to be replaced may be replaced. This may be accomplished by, e.g. tiling.

The replacement device generates the smallest replacement rectangle that completely covers the area to be replaced. This means that when converting from the replacement code coordinate system to the replacement device coordinate system, x1 and y1 should always be rounded down, and x2 and y2 should always be rounded up. A rectangle that displays less-objectionable material over the replaced area may be preferred to blurring or pixelating as the displayed rectangle guarantees total obfuscation of the specified area. However, alternate embodiments of the present invention may use other methods of obfuscating the replaced area (which may include replacement the entire screen).

If any of the four numbers of the AREA attribute (x1, y1, x2, or y2) are outside of the range 0-99, or if x1 is greater than or equal to x2, or if y1 is greater than or equal to y2, or if the attribute is syntactically invalid, then the partially-completed replacement code may be ignored, and all incoming characters are ignored until the next bracket character ("<") is received.

f. START Attribute

All replacement codes require the START attribute. Note that the START attribute follows the checksum at the end of the replacement code. This allows precise frame accurate placement of the START attribute after the replacement device may have had time to process the entire replacement code.

Replacement will begin in the frame containing the closing bracket of the START attribute and will continue for the number of frames specified by the DURATION attribute. However, in alternate embodiments the START attribute could identify an absolute start time, a relative start time, or a start location within the signal or recording. When encoding Line 21 data, CC1 and CC2 are given precedence over Text1 and Text2. Thus, it may be important that the encoding system place the start attribute at the appropriate time, even if the rest of the replacement code may have to be shifted several seconds earlier. The replacement device of the preferred embodiment will tolerate a delay of up to ten seconds between the checksum and the START attribute, which allows the broadcasting system maximum flexibility in fitting the data from CC1, CC2, and Text1 around the code in Text2. If more than ten seconds elapses between the closing bracket (">") on a replacement code and the start attribute, then the currently received replacement code and further START attributes are ignored until another replacement code may be received.

When there may be no partially-completed replacement code pending, all characters in Text2 are ignored by the replacement device until a left angle bracket ("<") may be detected. If the seven characters immediately following the left angle bracket are anything other than "replacement:", then the data may be discarded (ignored) and the replacement device returns to ignoring anything other than "<" characters. If a replacement code is missing a required attribute (such as the duration), the code may be ignored.

g. Checksums

The checksum may be computed using all data in the code from the opening angle bracket character ("<") to the closing square bracket character ("]") of the last attribute not including the checksum itself or the start code. The calculation may be performed according to the algorithm Internet RFC 1071, which makes it compatible with URL transmissions as defined in EIA-608-B.

The checksum may be computed by combining adjacent characters in the code into 16-bit integers and taking a ones-complement sum. If there is an odd number of characters, the final character may be paired with a zero. The ones-complement of this sum may be expressed as a four-digit hexadecimal number in square brackets.

The following Visual Basic routine provides an example of a software routine for calculating the checksum:

```
Private Function CalculateChecksum(code as String) as String
    Dim i As Integer
    Dim CS As Long
    i = 1
    CS = 0
    ' Build the checksum using long-integer arithmetic
    Do While i <= Len(code)
        If i + 1 <= Len(code) Then
            CS = CS + Asc(Mid(code, i + 1, 1))
        End If
        CS = CS + (256 * Asc(Mid(code, i, 1)))
        i = i + 2
    Loop
    ' Convert to ones-complement
    CS = (CS Mod 65536) + ((CS And &HFFFF0000) / 65536)
```

```
' Invert
CS = 65535 - CS
' Return checksum as string
CalculateChecksum = "[" & Hex(CS) & "]"
End Function
```

If the computed checksum for a code does not match the received checksum, then the next start attribute may be ignored, and the partially-completed code (or completed code) may be discarded. This prevents aberrant behavior when poor television reception causes transmission errors in the replacement codes.

h. Example Replacement Codes

The following are examples and interpretations of transmitted replacement codes and their attributes.

EXAMPLE 1

<replacement:v>[i:2][d:30][a:50,0-99,99][5658][s]
<replacement:v>—This is a V-code (violence);
[i:2]—The intensity is 2 (graphic violence);
[d:30]—The duration is 30 frames (one full second);
[a:50,0-99,99]—The area of the screen to block is the full right half of the screen, from coordinates (50,0) at the top center to (99,99) at the bottom right;
[5658]—This is the checksum;
[s]—Start.

EXAMPLE 2

<replacement:a>[w:QNZA][c:P][d:10][0755][s]
<replacement:a>—This is an A-code (audio);
[w:QNZA]—The word being marked is "damn". Shifting to all uppercase and applying ROT-13 coding encodes it into QNZA;
[c:P]—The audio being replaced is the primary program audio;
[d:10]—The duration is 10 frames (⅓ second);
[0755][s]—Checksum and start.

EXAMPLE 3

<replacement:s>[i:1][d:75][a:25,25-75,75][86F5][s]
<replacement:s>—This is an S-code (sexual content);
[i:1]—The intensity is 1 (mild nudity);
[d:75]—The duration is 75 frames (2½ seconds);
[a:25,25-75,75]—The area being obscured is half the screen width and half the screen height, right in the center of the screen;
[86F5][s]—Checksum and start.

EXAMPLE 4

<replacement:a>[w:ZVREQN][c:S][d:15][ACFA][s]
<replacement:a>—This is an A-code indicating the audio is to be replaced;
[w:ZVREQN]—The word being marked is mierda (a Spanish obscenity).
[c:S]—The audio channel to potentially be replaced is the SAP (second audio program) channel;
[d:15]—The duration is 15 frames (½ second);
[ACFA][s]—Checksum and start.

In the present embodiment, characters used for replacement codes in Text2 are generated and interpreted as ISO-8859-1 characters (also known as Latin-1 and compatible with US-ASCII), rather than as EIA/CEA-608-B characters. This maintains compatibility with URLs transmitted in Text2. Only characters between 20h and 7Eh are used. Two-byte EIA-608-B character codes and control codes are not permitted.

B. Encoding Process

As discussed above, the present invention includes the step of encoding the program to mark potentially objectionable material in the program. The encoding process generates replacement information and marks potentially objectionable content of the program, which may be subsequently used to identify and replace objectionable content from the program. The encoding may be performed off-line or on-line by the broadcaster, captioner, production house, post production house, or any entity with access to data representing the program, such as access to an audio and/or video signal, transmission signal, or recording of the program. The encoding may include embedding or inserting replacement information into the program sufficient to identify the potentially objectionable material (video and/or audio) or may include storing replacement information in a database or transmitting replacement information in a file separately from the program, sufficient to identify the potentially objectionable material in the program.

The encoding process may be accomplished through the use of an encoding system, which includes a computer system appropriately programmed to implement the encoding process of the present invention, as described in greater detail below. As may be well-known in the art, a conventional television signal includes five hundred and twenty-five (525) lines of information. However, not all of these lines of information are presented visually to the viewer. Specifically, line twenty-one may include the closed caption signal if it is supplied by the broadcaster.

In one embodiment of the present invention, the replacement information may be encoded in the Text 2 area of Line 21 of the VBI of a conventional television signal. In North America, the VBI may comprise lines 10 through 21 of the video signal. Transmission of data in line 21 of the video signal may be defined by Electronic Industries Association specification No. EIA-608, which may be incorporated herein by reference. More specifically, specification EIA-608 specifies protocols for embedding digitally encoded information packets containing information about a television program. EIA-608 thus defines protocols for transmitting information that may be useful for practicing the present invention.

In a digitally represented program, the data may be included in data packets having a particular header or other identifying characteristic. Alternately, the replacement information may be included as a separate data stream or data file and that, among other information, contains information identifying the frames or packets of data that contain potentially objectionable material in the program.

Figure 2:
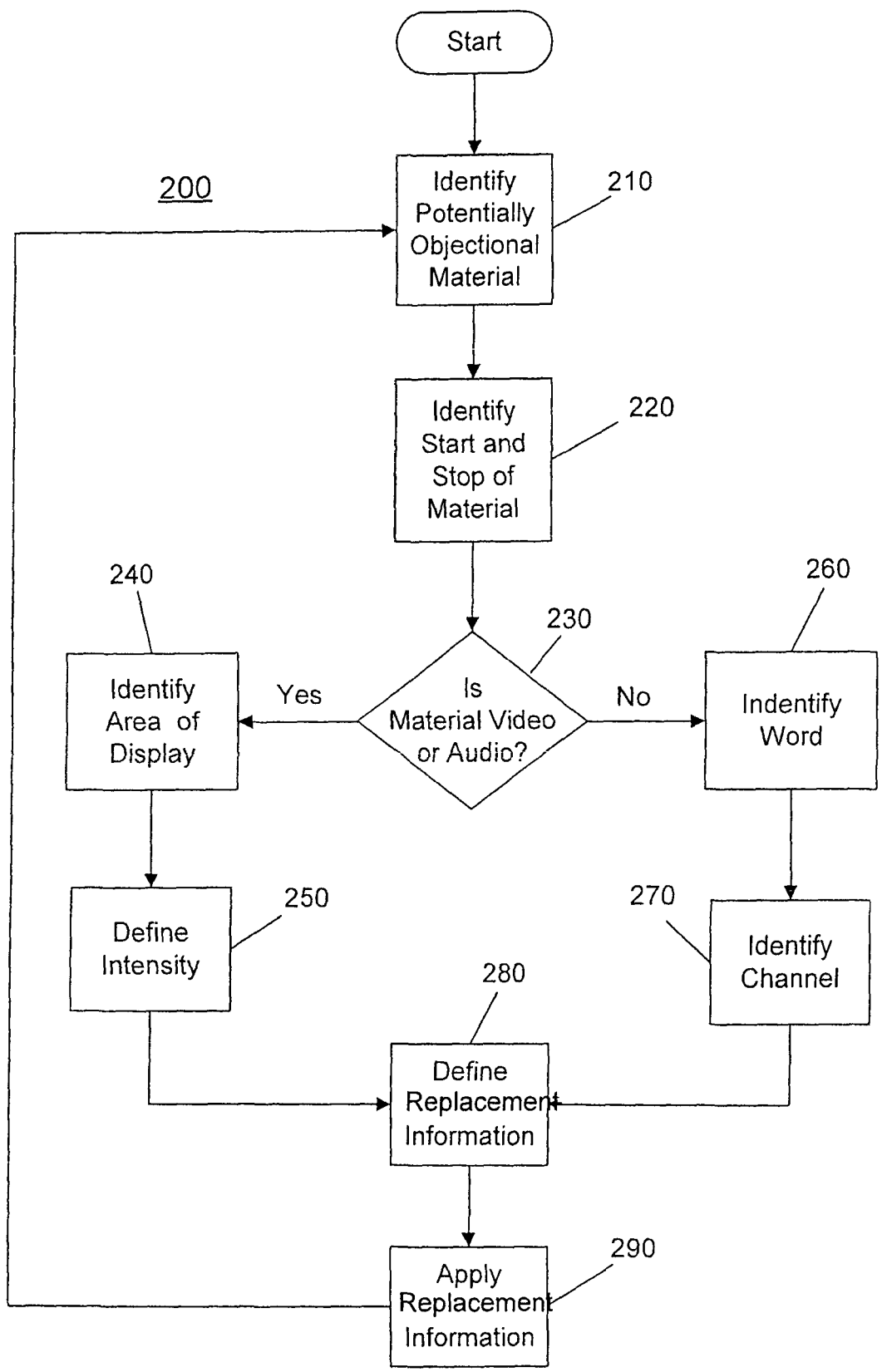
FIG. 2 is a flow diagram representing the method steps of the encoding process in accordance with the system, method, and computer program product of the present invention for selectively replacing objectionable content in a program with less-objectionable material, such as, e.g. advertisements.

Referring now to FIG. 2, a flow diagram representing the method steps of the encoding process in accordance with the system, method, and computer program product of the present invention for selectively replacement objectionable content from a program is shown. The encoding process 200 encodes the replacement information that identifies potentially objectionable video content according to the method steps shown in FIG. 2. At step 210, an encoder (e.g., a person) watches and listens to the program to identify potentially objectionable material in the program. As discussed, in one embodiment of the present invention, sexual content and violent content are considered potentially objectionable video material, and particular words and phrases, such as, for example, foul language like curse words, are also considered potentially objectionable audio material.

Once the potentially objectionable content is identified at step 210, the start and stop of the potentially objectionable material may be identified at step 220. This information might be the start and stop frame of the material, the start frame and duration of the material, start time and stop time (as measured from the beginning of the program), or any information suitable to facilitate reasonably precise replacement of the program, in the preferred embodiment of the present invention, the encoder identifies the frames in which the potentially objectionable material may be present, which may be stored in the memory of the encoding system and used to determine the DURATION and START attributes of the replacement code, as described above.

At step 230, the system determines whether the potentially objectionable content identified may be video content. If it is, then at step 240, the area of the video display where the potentially objectionable video content may be present and potentially to be replaced may be identified. The area of the display containing the potentially objectionable material may be identified by the encoder by using the pointing device (e.g., the mouse) of the encoding system to draw a rectangle (or other arbitrary shape) around the outer boundary of the potentially objectionable content. The coordinates of the shape are then stored in the encoding system memory to generate the AREA attribute of the replacement code.

If the potentially objectionable content identified may be video content, the intensity level of the potentially objectionable video material may be defined at step 250. As discussed above, in the example embodiment, the intensity level may be 1, 2, or 3 and may be dependent on the type of potentially objectionable video material (e.g., sexual content or violent content) and the intensity of the identified portion of the program. Thus, after comparing the potentially objectionable material with the appropriate intensity level standard, the encoder inputs the appropriate intensity level into the encoding system, which may be stored in memory and used to generate the replacement code.

If the potentially objectionable content identified may be audio content, the potentially objectionable audio material may be identified at step 260. In the preferred embodiment, this may be accomplished by supplying the word or phrase to the encoding computer system, which encodes the word according to ROT-13 encoding, as described above, and stores the encoded word in memory for use in the replacement code. If the potentially objectionable content identified may be audio content, the audio channel of the potentially objectionable audio may be identified at step 270 and stored in the encoding system memory for inclusion into the replacement code.

At step 280, the type of potentially objectionable content may be defined. As discussed, in the preferred embodiment the potentially objectionable content may be identified as either sexual video content (S-code), violent video content (V-code), or audio content (A-code). The encoder supplies the type of potentially objectionable material to the encoding system, where it may be stored for use in the replacement code.

Finally, at step 290, the replacement information may be applied to the program by marking the program with the replacement information. As discussed above, this may include embedding the information in the program or storing the replacement information to be supplied with the program in a separate signal, transmission, or data file. In the preferred embodiment of the present invention, the replacement codes are encoded in the Text 2 area of Line 21 of the VBI.

While the encoder of the example embodiment described above may be a person watching and listening to the program and supplying replacement information, in an alternate embodiment, the encoder may be a closed caption decoder and an appropriately programmed computer system that compares the closed caption of the program with a database of potentially objectionable words and phrases and provides inputs to the encoding system as may be appropriate. In still another embodiment, well-known voice recognition software that converts the audio to text could be used with an appropriately programmed computer system that compares the converted audio of the program with a database of potentially objectionable words and phrases.

C. Decoding Process

Figure 3:
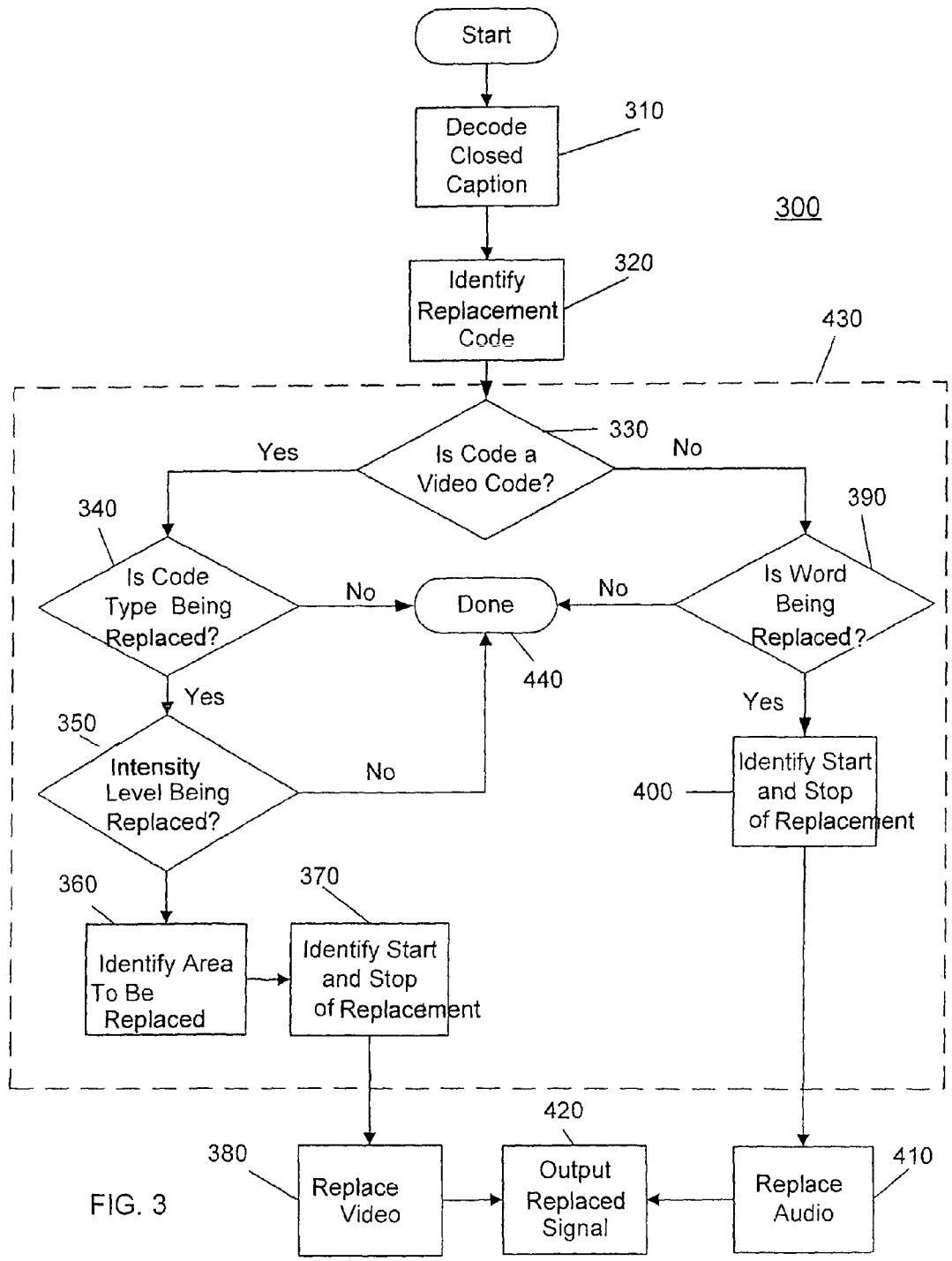
FIG. 3 is a flow diagram representing the decoding process in accordance with the system, method, and computer program product of the present invention for selectively replacing objectionable content in a program with less-objectionable material, such as, e.g. advertisements.

Upon being supplied the encoded program in the form of an audio and/or video signal representing the encoded program—either by reception of a transmission or by playback from a recorded medium—the replacement device performs the decoding process. With reference to FIG. 3, a flow diagram representing the decoding process in accordance with the system, method, and computer program product of the present invention for selectively replacement objectionable content from a program may be shown.

As will be discussed in more detail below, the replacement device includes a processor executing software designed to operate the replacement device to implement the decoding steps. Appropriate software can be readily prepared by programmers of ordinary skill based on the teachings of the present disclosure, as will be apparent to those skilled in the software arts.

In one embodiment of the present invention, at step 310 of the decoding process 300, the closed caption of the video signal may be decoded. At step 320, the replacement codes are identified, which themselves identify potentially objectionable content. As discussed in more detail above, if the process receives a partial replacement code, a replacement code with invalid syntax, a replacement code with an incorrect checksum, or a replacement code with some other defect, the process will discard the replacement code. The combination of steps 310 and 320 of the decoding process of this example embodiment shown in FIG. 3, corresponds generally to step 120 of FIG. 1 (Extract Replacement Information).

In this embodiment, the codes may be either video or audio codes. Thus, at step 330, the process determines whether the potentially objectionable content may be video. If so, the process continues to step 340, which determines if the potentially objectionable material may be of a type that may be being replaced. More specifically, the replacement code may be compared with the replacement criterion that may be supplied by the user to determine whether the user desires to replacement that particular type (e.g., sexual content or violent content) of potentially objectionable material.

If the replacement code does not match the replacement criterion (indicating that that type of potentially objectionable material should not be replaced), then no replacement need be performed and the process terminates at step 440 until new replacement information may be identified. For example, if the user may have elected to not replacement any violent content and the replacement code may be a V-code, then the process does not replacement the potentially objectionable video content marked by the V-code.

If, at step 340, it may be determined that the replacement code of the replacement information does match the replacement criterion, (indicating that the potentially objectionable content may be of a type that should be replaced), at step 350, the intensity level of the replacement code may be compared with a corresponding replacement criterion to determine if the material should be replaced. Specifically, the process determines if the intensity level of the potentially objectionable content may be of a level that should be replaced by comparing the intensity level of the material with the intensity level that the user supplied replacement criterion indicates should be replaced. For example, if the user supplied replacement criterion indicates that only sexual content with an intensity level of two or greater should be replaced, and the replacement code may be an S-code with an intensity level of one, the process does not replace the video content marked by the S-code. If it is determined at step 350 that the video should not be replaced, the process terminates at step 440 until new replacement information may be identified.

If, at step 350, it may be determined that the intensity level of the potentially objectionable content may be of a level that should be replaced, the area of the video display to be replaced may be identified from the replacement code's AREA attribute at step 360, and at step 370, the start and stop points for replacement the video are determined by using the DURATION and START attributes as described above.

At step 380, the video may be replaced according to the processed replacement information and, at step 420, may be output for viewing, transmission, or recording.

If, at step 330, the potentially objectionable content may be determined to be audio, the process continues to step 390, which determines if the word or phrase identified as potentially objectionable may be a word or phrase (hereinafter collectively referred to as "word") that should be replaced. This determination may be accomplished by comparing the word with the replacement criterion. In this example embodiment, the audio replacement criterion includes a word list, described in more detail below, including information of numerous variations of words that the user may have indicated should be replaced. As discussed above, the word list may be include data from the user, downloaded from a remote source, and/or originally supplied with the replacement device. If an A-code identifies a word that may not be in the word list, the word marked by that A-code may not be replaced from the audio, and the process terminates at step 440 until new replacement information may be identified. If the word identified matches the replacement criterion (indicating that it may be a word or phrase that should be replaced), the start and stop points for replacement the audio are determined at step 400 by using the DURATION and START attributes as described above.

The system may also optionally replace the closed caption, which prevents display of the offensive word in the displayed closed caption. If a word identified may be in the word list, each letter in the word present in the closed caption will be replaced in the closed caption with one letter of the name of a product or a service. A list of names of products or services of various lengths could, e.g. be maintained in the less-objectionable material so that a word of the same length as that of the word to be replaced could be selected.

At step 410, the audio may be replaced and at step 420 may be output for recording or for immediate audible production.

Functional blocks within the dashed box 430 correspond generally to functional block 130 of FIG. 1. Likewise, the combination of functional blocks 380 and 410 of FIG. 3 correspond generally to functional block 140 of FIG. 1, and functional block 420 of FIG. 3 corresponds generally to block 150 of FIG. 1.

D. Set-up Process

As discussed above, the process of the present invention compares replacement information with the replacement criterion to determine whether potentially objectionable material is to be replaced with less-objectionable material. A replacement criterion may be supplied by the user, downloaded from a remote device, or supplied with the replacement device. The set up process allows the user to supply and modify a replacement criterion stored in the replacement device. In the preferred embodiment, the user enters replacement settings to establish and change a replacement criterion through a user input device, such as, for example, a remote control.

The replacement settings entered by the user include the types of video replacement to be performed (violence and/or sexual content), if any, and the intensity level for each type of video replacement (e.g., 1, 2, or 3). In an alternate embodiment, the user may enter a zero as the intensity level to indicate that no replacement should be performed. In this alternate embodiment, the decoding process need not perform step 340 (determine if code may be of a type to be replaced), but instead could simply compare the intensity level of the code with the replacement criterion.

In addition, the user may enter replacement settings to establish or change the replacement criterion for the audio, which includes information indicating whether audio replacement is to be performed and which may include specific words to be replaced. In addition, the replacement device of the present invention includes potentially objectionable words pre-stored during the manufacturing process and/or periodically downloaded from a remote source—all of which may be modified by the user. All the user-supplied information may be stored in nonvolatile memory in the replacement device.

In addition, the user can use the remote control to override the replacement function of the replacement device by establishing a password or personal identification number ("PIN"), and then entering the appropriate password or PIN to override the replacement process. This permits those who know the appropriate password or PIN to watch or listen to an individual program that the replacement device may otherwise replace portions of, without reprogramming the replacement device. At the end of the program (or after a time period), the replacement device may be programmed to automatically resume its normal replacement. Replacement device 600 can also detect when a program may be over by monitoring data packets containing the title or identification number for the current program, as may be well known in the art. Thus, in one embodiment of the present invention, the replacement device returns to normal replacement when a new program may be present (e.g., after the program may be over or when a new channel or station with a different program may be tuned to).

II. System of the Present Invention

A. Hardware

1. Encoding

Figure 4:
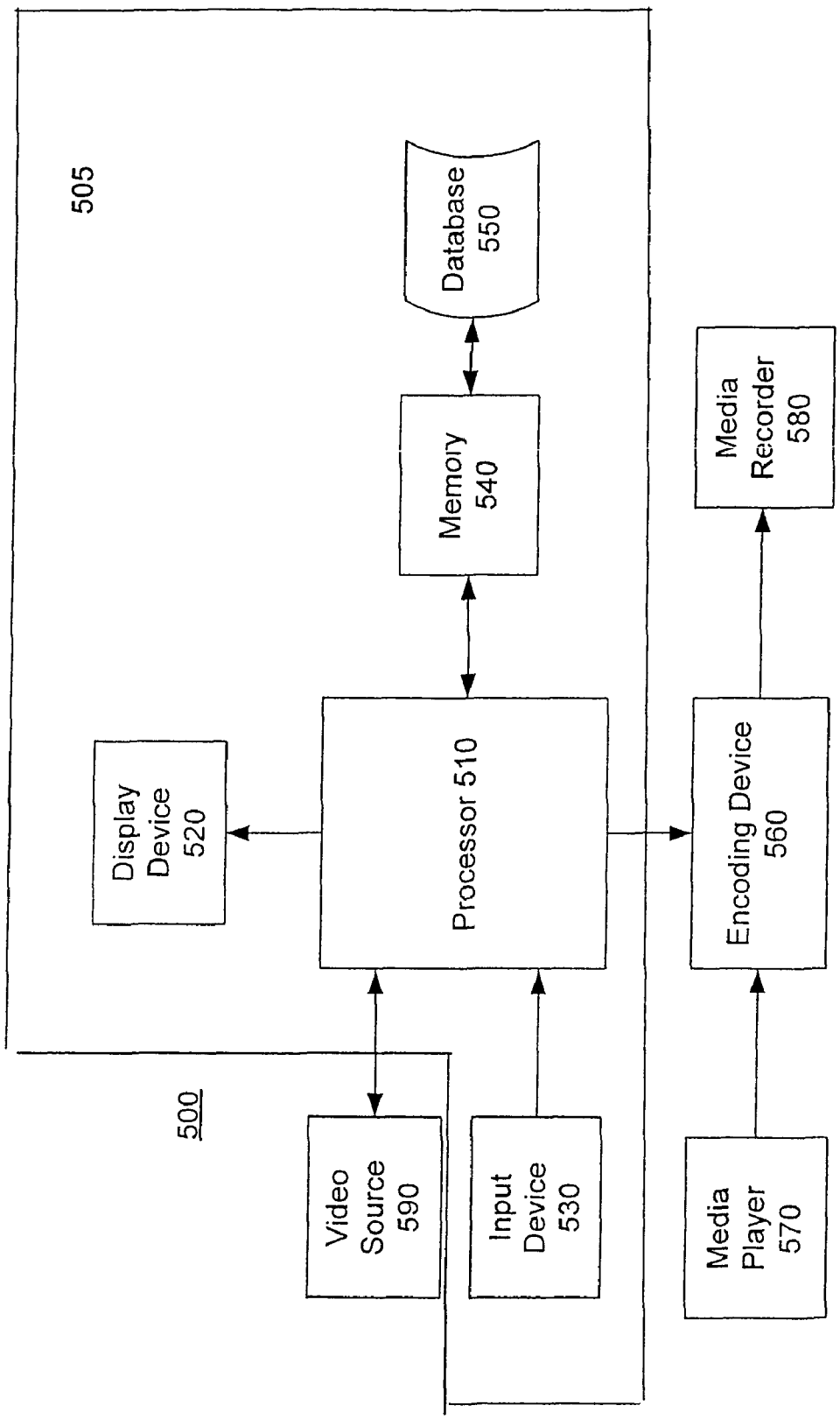
FIG. 4 is a functional block diagram of the encoding system of the system, method, and computer program product of the present invention for selectively replacing objectionable content in a program with less-objectionable material, such as, e.g. advertisements.

Referring now to FIG. 4, a functional block diagram of the encoding system of the system, method, and computer program product of the present invention for selectively replacement objectionable content from a program may be shown. This exemplary embodiment of an encoding system in accordance with the present invention includes an encoding device 560 and a computer system 505 comprising a processor 510 programmed according to the teachings of the present invention, which can be readily prepared by programmers of ordinary skill based on the teachings of the present disclosure as will be apparent to those skilled in the art. In addition, the computer system 505 includes a display device 520, an input device 530 (such as a keyboard and mouse), and a memory 540, including a database 550. The database contains, among other data, a word list of all the potentially objectionable words and phrases, and may be accessed by the system as part of the identification of potentially objectionable audio content.

The processor 510 may be coupled to an encoding device 560, which receives the program from a media player 570, or that may be transmitted from a remote location. The encoding device encodes the program according to the encoding process of the present invention, as described above, and outputs the encoded program for storage in a media recorder 580 or for transmission. In addition, the system may include a video source 590, such as a DVD player or CD-ROM drive, that may be used to encode programs in other formats and/or mediums.

As discussed above, the encoding system of the preferred embodiment includes an encoding device 560 for encoding the replacement information into the closed caption field of the VBI. There are numerous commercially available encoding devices that could be used to perform this step of the preferred embodiment such as the EEG EN-470 Smart Encoder III by EEG Enterprises, Inc. of Farmingdale, N.Y.; the Closed Caption Encoder for Personal Computers (CCE/PC) by Soft Touch Inc. of Alexandria, Va.; many of the caption encoders manufactured by Ultech Co., Ltd. of Korea, and the Norpak TES3 (which can encode Line 21 captioning into NTSC, PAL, and SECAM video) by Norpak of Kanata Ontario, Canada. In an alternate embodiment of the present invention, such as for encoding into a digital video signal, the Evertz 8070 Digital Encoder by Evertz Microsystems of Burlington, Ontario, Canada could be used.

2. Decoding

Figure 5:
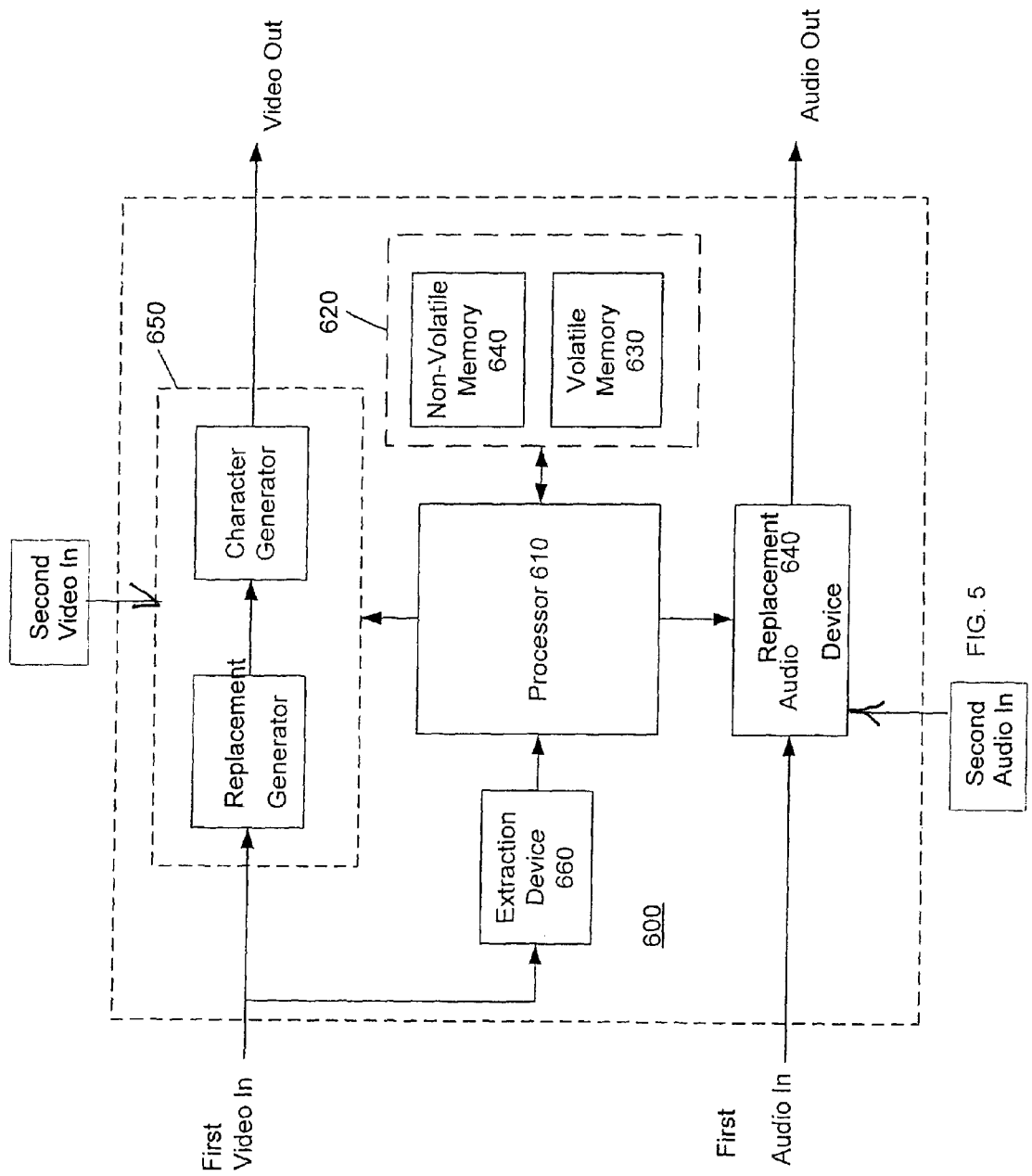
FIG. 5 is a functional block diagram of the replacement device of the system, method, and computer program product of the present invention for selectively replacing objectionable content in a program with less-objectionable material, such as, e.g. advertisements.

Turning now to FIG. 5, a functional block diagram of the replacement device of the system, method, and computer program product of the present invention for selectively replacing objectionable content in a program with less-objectionable content such as, e.g. advertising may be shown. Replacement device 600 includes a general purpose processor 610 appropriately programmed with software implementing the decoding process of the present invention that can be readily prepared by programmers of ordinary skill based on the teachings of the present disclosure, as will be apparent to those skilled in the software art. The processor 610 may be a microprocessor, microcontroller, RISC processor, or any processing device capable of executing software instructions and acting on them accordingly.

The replacement device 600, in this example embodiment of the present invention, may be in the form of a set top box and includes an extraction device 660, an audio replacement device 640, a video replacement device 650, and main memory 620. The main memory 620 includes random access memory (RAM) 630 or other dynamic storage device (e.g., dynamic RAM (DRAM), static RAM (SRAM), synchronous DRAM (SDRAM), flash RAM)), coupled to a bus for storing information and instructions to be executed by processor. In addition, main memory 620 also includes nonvolatile memory 640 for storing a replacement criterion, passwords/PINs, and other information.

Replacement device 600 further includes a read only memory (ROM) or other Static storage device (e.g., programmable ROM (PROM), erasable PROM (EPROM), and electrically erasable PROM (EEPROM)) (not shown) coupled to a bus for storing static information and instructions for the processor 610.

The main memory 620 of the replacement device 600 may store structures, tables, records, or other data described herein. As discussed, the present invention includes software for controlling the replacement device, for driving a device or devices for implementing the decoding process of the present invention, and for enabling the replacement device to interact with a human user. Such software may include, but is not limited to, device drivers, operating systems, development tools, and application software.

In the example embodiment of the present invention, a television broadcast signal may be received through a coaxial cable from the head end of the cable broadcaster. The incoming television signal could, alternatively, be delivered to the replacement device 600 by satellite, by cable, by VHF or UHF broadcast, or in any other suitable way. The incoming signal may also be the output from a video playback device, for example, a video cassette recorder ("VCR"), a laser disk player, or a DVD. Suitable transmission media includes coaxial cables, copper wire and fiber optics, telephone transmission lines, and radio wave broadcasts including digital satellite broadcasts. The transmission media may also take the form of acoustic or light waves, such as those generated during radio wave and infrared data communications.

Similarly, less-objectionable material such as, e.g. advertisements may be supplied in the form of a television broadcast signal received through a coaxial cable from the head end of the cable broadcaster. The less-objectionable material could, alternatively, be delivered to the replacement device 600 by satellite, by cable, by VHF or UHF broadcast, or in any other suitable way. The less-objectionable material may also be stored in a video playback device, for example, a video cassette recorder ("VCR"), a laser disk player, or a DVD. Suitable transmission media includes coaxial cables, copper wire and fiber optics, telephone transmission lines, and radio wave broadcasts including digital satellite broadcasts. The transmission media may also take the form of acoustic or light waves, such as those generated during radio wave and infrared data communications.

The replacement device 600 may have inputs for two or more signals, which comprise an incoming video FIRST VIDEO IN and/or audio FIRST AUDIO IN signal, and a signal representative of the less-objectionable material, SECOND VIDEO IN, SECOND AUDIO IN. The replacement device 600 also may have outputs for a composite video and audio, which may be connected to the appropriate inputs of a television, a VCR, or other device. Separate outputs and inputs (not shown) for a composite audio-video signal and/or other signal format(s) may also be provided in addition to, or instead of, the described outputs and inputs.

Replacement device 600 also includes an extraction device 660. The video signal may be supplied to the extraction device 660, which in the present examplary embodiment, may be a decoder chip, such as a 86129 Decoder and On Screen Display chip available from Zilog Corporation. The extraction device 660 could be implemented with other similar integrated circuits, with other multi-purpose integrated circuits, with discrete components, or with some combination thereof. The extraction device 660 extracts the data from Line 21 of the VBI and supplies the data to the processor 610 for processing, thereby performing step 310 of the decoding process.

The processor 610 receives the extracted data, groups the characters to recognized replacement codes, attributes, words, and delimiters whose meanings are discussed above, and performs the steps described above to determine whether to replace some of the program content with less-objectionable material. More specifically, after identifying a valid replacement code, the processor 610 compares the code and its associated replacement information (e.g., code type, and intensity level or word/phrase) with the stored replacement criterion to determine whether the potentially objectionable material should be replaced from the program, as discussed with respect to step 130 of FIG. 1 and the steps in block 430 of FIG. 3.

Replacement device 600 also includes an audio replacement device 640, which may be operatively coupled to the processor 610. Upon determination that the audio may be to be replaced, the processor 610 causes the audio replacement device 640 to replace the audio for a specified duration, and at the start time (or frame) as dictated by the attributes of the received A-code. The audio replacement device 640 could be implemented with any of the many well-known devices capable of replacing the audio including discrete components (any of the numerous transistor switches), or integrated circuit switches, which operate to disconnect the output from the standard input and reconnect it to an input of less-objectionable material. Other types of replacement devices well-known in the art would also suffice.

Replacement device 600 also includes a video replacement device 650, which may be operatively coupled to the processor 610. When the received replacement code and the stored replacement criterion indicate that the video should be replaced, processor 610 causes the video replacement device 650 to replace the video in the area with less-objectionable material, at the start frame, and for the duration designated by the replacement code's attributes so that the objectionable video may not be produced by the television display or recorded on any medium receiving the video signal. In the preferred embodiment, the video replacement device 650 may be comprised of a switch which operates to disconnect the output from the standard input and reconnect it to an input of less-objectionable material to replace the video signal at the designated area.

The video replacement device 650 could be implemented with any of the many well-known devices capable of replacing a portion of the video including character generators, superimposers, on-screen display chips, discrete components (e.g., transistor switches), other integrated circuit switches, or some combination thereof. Other types of video control devices well-known in the art would suffice as well. In addition, audio replacement 640 and video replacement device 650 could be implemented with the same or common circuitry.

The output of the replacement device 600 may be supplied to a television, a monitor, or to a video cassette recorder (VCR) (or other audio/video display/recording device) and then supplied to the television.

Replacement device 600 also includes a user input device or component, which can be any means that allows a user to input information, such as replacement settings for establishing or changing a replacement criterion, including passwords, PINs, and other replacement information, to the replacement device. In the preferred embodiment of the present invention, the input means includes an infrared remote control transmitter (not shown), which transmits control signals to an infrared receiver (not shown) in the replacement device. When the infrared receiver receives a control signal from the infrared transmitter, it interrupts the processor 610. Processor 610 can then retrieve and interpret the transmitted information. The user input means allows the user to perform the set up process described above, as well as override replacement, and establish and change replacement settings. Replacement device 600 also includes a visual display, such as an LED display, to provide visual feedback to the user relating to its operation.

The replacement device 600 performs a portion of, or may perform all of, the processing steps of the decoding process of the present invention in response to the processor 610 executing one or more sequences of one or more instructions contained in main memory 620. One or more processors in a multi-processing arrangement may also be employed to execute the sequences of instructions contained in the main memory. In alternative embodiments, hard-wired circuitry may be used in place of, or in combination with, software instructions. Thus, systems, devices, components, and methods embodying the present invention are not limited to any specific combination of hardware circuitry and software.

The replacement device 600 also includes a communication interface (not shown) coupled to the bus. The communication interface provides a two-way data communication coupling to a network link that may be connected to a local network (e.g., LAN), cable network, satellite system, etc. For example, the communication interface may be a network interface card to attach to any packet switched local area network (LAN). As another example, the communication interface may be an asymmetrical digital subscriber line (ADSL) card, an integrated services digital network (ISDN) card, or a modem to provide a data communication connection to a corresponding telephone line. Wireless links may also be implemented. In any such implementation, the communication interface sends and receives electrical, electromagnetic or optical signals that carry digital data streams representing various types of information. The replacement device can transmit notifications and receive data, including program code, through the network(s), network link, and communication interface.

The replacement device may also include special purpose logic devices (e.g., application specific integrated circuits (ASICs)) or configurable logic devices (e.g., generic array of logic (GAL) or reprogrammable field programmable gate arrays (FPGAs)) as may be necessary for the intended application.

The replacement device may optionally include a tuner, which, as may be well known in the art, receives a plurality of radio frequency signals. The tuner selects a particular channel (usually based on frequency), may or may not amplify it, and supplies it to the extracting device 610, video replacement 650 and/or audio replacement 640 of the replacement device 600 of the present invention. In an alternate embodiment, the tuner may be a digital tuner that selects a digitally broadcast signal transmitted on a radio carrier wave.

Those skilled in the art will readily understand that the functionality described herein can be achieved through the use of different components including the components used for the microprocessor and extraction device. The particular circuitry associated with the processor 610, and the circuitry for interfacing the processor to other devices, such as memory, and the other parts of the apparatus can have many variations. Those skilled in the art will readily understand how the replacement device 600 could be constructed in light of this disclosure.

B. Software

The system and method of the present invention may be preferably implemented in general purpose processors running computer programs comprised of software modules implementing the process of the present invention for selectively replacing objectionable content in a program with less-objectionable content. The architecture, design, modules, and code of the software of the present invention could be implemented in a variety of ways and the manner in which it may be implemented may be largely a matter of design choice well within the ordinary skill level of those skilled in this art. Further, the data stored in memory and used by the computer program may be dependent on the software implementation of the present invention. As would be evident to one skilled in the art, the results of the computations for implementing the present invention, such as replacement code comparisons, replacement a criterion, passwords, PINs, replacement code attributes, and other information are stored in memory and retrieved from memory as needed.

1. Encoding Software

As discussed, the present invention uses a computer system that interfaces with an encoding device to perform the encoding process according to the present invention. There are numerous commercially available computer programs that could be used to implement the present invention provided by companies such as Computer Prompting and Captioning Co. of Rockville, Md.; Cheetah Systems, Inc. of Tucson, Ariz.; image Logic of Chevy Chase, Md.; and Advantage Software of Stuart, Fla., as well as proprietary software used by captioning service providers such as VITAC of Cannonsburg, Pa.; National Captioning Institute of Vienna, Va.; and The Caption Center/WGBH of Boston, Mass.

As will be apparent to those skilled in the software art, appropriately programmed software could also be readily prepared by programmers of ordinary skill based on the teachings of the present disclosure.

2. Decoding Software

The replacement device 600 performs processing steps of the present invention in response to the processor 610 executing one or more sequences of one or more instructions contained in main memory 620. As will be apparent to those skilled in the software art, appropriately programmed software can be readily prepared by programmers of ordinary skill based on the teachings of the present disclosure.

In addition, a remote computer can load the instructions for implementing all or a portion of the present invention remotely into a dynamic memory and send the instructions over a telephone line using a modem or over a cable signal line to the bus in the replacement device 600. The bus carries the data to main memory, from which the processor retrieves and executes the instructions. The instructions received by main memory may optionally be stored on storage device either before or after execution by processor.

a. The Word List

As discussed above, the replacement device 600 includes a replacement criterion, which are used to determine whether a marked portion of the program may be replaced. One portion of the replacement criterion may be the word list, which may be a set of data stored in the memory of the replacement device that identifies words and phrases that the user wishes to replace (provided audio replacement is turned on). The word list can be pre-programmed by the manufacturer, downloaded from a remote site, entered by the user, or some combination thereof which may include periodic updates. This word list may be stored in all uppercase with no accent marks. For example, an obscenity in another language with an accented lowercase a (such as à, á, â, or ä) may be stored in the word list as an "A". The enya (Ñ) may be stored as a plain N, and the c-cedilla (ç) may be stored as a plain C.

The words in the list may also contain wildcards. An asterisk (*) means zero or more of any character, and a question mark (?) means precisely one of any character. For example, if "*shit" is present in the word list, the processor will replace the words shit, bullshit, horseshit, and anything else ending with shit. If "shit*" is present, the device will replace the words shit, shitty, shithead, and anything else starting with "shit." If "*shit*" is present in the word list, the device will replace any word containing "shit" anywhere in it.

The words before and after a hyphen are treated as separate words. For example, if "shit" is in the word list, then the replacement device will replace and display "shit-for-brains" as, e.g. "ACME-for-brains." No wildcard is required to accomplish this.

When words are being replaced in the closed caption, the entire word may be changed to characters—not just the non-wildcard parts. In the example above, if the list contains "*shit", then "bullshit" may be changed to, e.g. "PEERLESS", not "bullACME."

For replacement purposes of words in the closed caption, the apostrophe counts as the start of a new word. In other words, if "crap" is in the word list, the sentence "That's a lotta crap" may be replaced to "That's a lotta ACME."

While the examplary embodiment of the present invention described above uses V-codes, S-codes, and A-codes, additional codes or fewer codes be used. In addition, audio replacement may be omitted, or performed in a different manner.

For example, Automatic Obscenity Audio Replacement (AOAR) may be a means for replacing the audio of programming that does not contain A-codes, which may be used instead of, or in addition to, A-codes. AOAR compares the text present in the closed caption that represents the audio with the word list to identify potentially objectionable audio. When AOAR is turned on and the replacement device recognizes a word that should replaced in the closed caption, it will estimate the time at which it should start replacing the audio signal, and replace the audio for a predetermined amount of time (usually 1.0 to 1.5 seconds) starting at the estimated start time, with less-objectionable content.

One possible algorithm for estimating the time to replacement the audio assumes that a pop-on caption appears just as the caption's first word may be spoken. This assumption may not always be correct, but generally provides a good starting point. The replacement device can either keep a running calculation of average reading rate over the prior few minutes, or simply use a typical value such as one hundred and sixty (160) words per minute.

To determine when replacement should start, the system calculates how many words in the caption need to be skipped in order to reach the word to be replaced and multiplies the reading rate in frames per word by the number of words.

For example, 160 wpm equals 11.25 frames per word. If the objectionable word is the fourth word in the caption, the calculation would be 3 multiplied by 11.25 which equals 33.75 frames. Rounding this number to thirty-four (34), the processor would cause the audio replacement to start replacement thirty-four frames after the caption appears.

As with the preferred embodiment, this alternate embodiment may replace each letter in the objectionable word with an uppercase letter of, e.g. an advertiser's name. This prevents display of the offensive word in the displayed closed caption.

While the preferred embodiment may be implemented to replacement NTSC programming, an alternate embodiment could be used to replacement digital programming in which case the replacement information could be sent as a separate file (such as a separate database file) or with information in each digital packet (such as a portion of the header) that identifies the packet as replacement information. The replacement packets would then identify the program packets containing potentially objectionable content.

In still another embodiment, the present invention could be used with High Definition TV (HDTV) in which the replacement information could be embedded in the captions according to, e.g. EIA-708.

In yet another embodiment, the replacement information could be stored in a separate file according to, e.g. the Synchronized Accessible Media Interchange (SAMI) format.

Information for practicing the invention could also be conveniently transmitted as, e.g. XDS data using the undefined data type provided by, e.g. EIA-608. This or similar information could also be encoded and transmitted in ways which do not conform with the EIA-608 specification.

The computer code of the present invention may be any interpreted or executable code mechanism, including but not limited to scripts, interpreters, dynamic link libraries, Java classes, and complete executable programs. In the example embodiment, the software may be stored in memory as an executable program. Moreover, parts of the processing of the present invention may be distributed for better performance, reliability, and/or cost.

It will be readily apparent to those skilled in the art that the invention could be practiced with other protocols and/or by encoding, embedding or supplying the data in, or along with, the video signal using other encoding, embedding, or marking techniques. It may be important, however, that the potentially objectionable material in the program be locatable (either temporally, positionally, or spatially) in the audio and/or video signal.

The computer program and software modules of the system, method, and computer program product of the present invention may be implemented using any operating system, and associated hardware including, but not limited to, Unix, Linux, VMS, IBM, Microsoft Windows NT, 95, 98, 2000, ME, and XP, Palm OS, Microsoft Windows CE and the like.

The systems, processes, and components set forth in the present description may be implemented using one or more general purpose computers, microprocessors, or the like programmed according to the teachings of the present specification, as will be appreciated by those skilled in the relevant art(s). Appropriate software coding can readily be prepared by skilled programmers based on the teachings of the present disclosure, as will be apparent to those skilled in the relevant art(s).

The present invention thus also includes a computer-based product which may be hosted on a storage medium and include instructions that can be used to program a computer(s) or like device(s) or component(s) to perform a process in accordance with the present invention. The storage medium can include, but may not be limited to, any type of disk including a floppy disk, optical disk, CDROM, magneto-optical disk, ROMs, RAMs, EPROMs, EEPROMs, flash memory, magnetic or optical cards, or any type of media suitable for storing electronic instructions, either locally or remotely.

The foregoing has described the principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention. For example, the present invention may also be built into a television set as opposed to a stand-alone set top unit. While a preferred embodiment of the present invention has been described above, it should be understood that it has been presented by way of example only, and not limitation. Thus, the breadth and scope of the present invention should not be limited by the above described exemplary embodiment.

Obviously, numerous modifications and variations of the present invention are possible in light of the above teachings. It is therefore to be understood that within the scope of the appended claims, the invention may be practiced otherwise than as specifically described herein.

What is claimed is:

1. An apparatus for selectively replacing objectionable content in a video program intended for viewing on a display screen comprising a first video signal with less-objectionable content, comprising:

an extraction device receiving at least a portion of the first video signal and configured to extract information therefrom;
a replacement control device;
a processor operatively coupled to said replacement control device and communicatively coupled to said extraction device for receiving at least a portion of said extracted information therefrom;
a memory coupled to said processor and storing a replacement criterion;
said processor programmed to identify replacement information in said extracted information;
a replacement video signal including said less-objectionable content communicatively coupled to said replacement control device; and
said processor programmed to cause said replacement control device to replace a portion of the first video signal with said replacement video signal in response to identifying replacement information that satisfies said replacement criterion, wherein said less-objectionable content comprises advertising and wherein the advertising only replaces specified subregions of displayed video frames corresponding to the location of the objectionable content within the displayed video frames.

2. The apparatus of claim 1, wherein said first video signal is selected from the group consisting of: a Digital Radio Broadcast signal, a broadcast television signal, a cable television signal, an RF signal, and an Internet signal.

3. The apparatus of claim 1, wherein said replacement information is present in a vertical blanking interval of the first video signal.

4. The apparatus of claim 1, wherein said replacement information is present in a line 21 of the first video signal.

5. The apparatus of claim 4, wherein said replacement information is present in a Text field of the first video signal.

6. The apparatus of claim 1, wherein said replacement information includes information relating to a duration the portion of said first video signal is to be replaced in response to said replacement information satisfying said replacement criterion.

7. The apparatus of claim 1, wherein said replacement information includes content selected from the group consisting of: information identifying a portion of the first video signal having violent content, information identifying a portion of the first video signal having sexual content, and information identifying a portion of the first video signal having potentially objectionable language.

8. The apparatus of claim 1, wherein said replacement information includes information relating to a time in the first video signal at which the replacing should begin.

9. The apparatus of claim 1, wherein said replacement information includes information relating to a level of intensity of the objectionable content.

10. The apparatus of claim 1, wherein:
said memory contains a plurality of words stored therein;
said extraction device is configured to extract a closed caption signal from the first video signal;
said processor receives said extracted closed caption signal and is programmed to compare words in said extracted closed caption signal with said words stored in said memory; and
said processor causes said replacement device to replace an audio signal in response to determining that a word stored in said memory is present in said extracted closed caption signal.

11. The apparatus of claim 1, wherein said replacement criterion is received from a user.

12. A method of selectively replacing objectionable content in a first video signal intended for viewing on a display screen with less-objectionable content, said method comprising the steps of:
storing a replacement criterion in a memory;
receiving said less-objectionable content as a replacement video signal;
receiving the first video signal;
extracting replacement information from the first video signal;
determining whether the extracted replacement information satisfies said replacement criterion; and
replacing a portion of the first video signal with the replacement video signal in response to determining that said extracted replacement information satisfies said replacement criterion, wherein said less-objectionable content comprises advertising and wherein the advertising only replaces specified subregions of displayed video frames corresponding to the location of the objectionable content within the displayed video frames.

13. The method of claim 12, wherein said first video signal is selected from the group consisting of: a Digital Radio Broadcast signal, a broadcast television signal, a an cable television signal, an RF signal, and an Internet signal.

14. The method of claim 12, wherein said replacement information is present in a vertical blanking interval of the first video signal.

15. The method of claim 12, wherein said replacement information is present in a line 21 of the first video signal.

16. The method of claim 12, wherein said replacement information is present in a Text field of the first video signal.

17. The method of claim 12, wherein said replacement information includes information relating to a duration the portion of said first video signal should be replaced in response to said replacement information satisfying said replacement criterion.

18. The method of claim 12, wherein said replacement information is selected from the group consisting of: information identifying a portion of the first video signal having violent content, information identifying a portion of the first video signal having sexual content, and information identifying a portion of the first video signal having potentially objectionable language.

19. The method of claim 12, wherein said replacement information includes information relating to a relative time in the first video signal said replacement should begin.

20. The method of claim 12, wherein said replacement information includes information relating to the level of intensity of the objectionable content.

21. The method of claim 12, further including:
storing a plurality of words in said memory; extracting a closed caption signal from the first video signal;
comparing said closed caption signal with said words stored in said memory; and
replacing the word in an audio signal with less-objectionable content in response to determining that a word in said memory is present in said closed caption signal.

22. The method of claim 12, further comprising the step of receiving said replacement criterion from a user.

23. A method for selectively replacing objectionable content from a signal having both audio and video signal components intended for presentation on a display screen, said method comprising:
storing replacement criteria in a memory identifying disallowed video content;
receiving the signal;
extracting information from said signal identifying objectionable content in said signal;
determining whether said extracted information satisfies said replacement criteria; and
modifying the video signal component with replacement video data in response to determining that said extracted information satisfies said replacement criteria so that only specified subregions of displayed video frames corresponding to disallowed video content are replaced with advertising.

24. The method of claim 23, wherein said extracted information includes information relating to the duration the video signal component of said signal should be modified in response to said extracted information satisfying said replacement criteria.

25. The method of claim 23, wherein said extracted information includes information relating to the level of intensity of the objectionable content.

26. The method of claim 23, further comprising the step of receiving said replacement criteria from a user.

27. The method of claim 23, wherein said extracted information is present in the vertical blanking interval of a television signal.

28. The method of claim 27, wherein said extracted information is present in line 21 of the television signal.

29. A device for selectively filtering objectionable content from a video program intended for viewing on a display screen comprising a video signal component, said device comprising:
an extraction device receiving all or part of said video signal component and configured to extract filter codes therefrom identifying potentially objectionable content in said video program;
a video control device;
a processor operatively coupled to said video control device and communicatively coupled to said extraction device for receiving extracted filter codes;
a memory coupled to said processor and storing criteria defining disallowed video content; and
said processor programmed to cause said video control device to selectively obscure only subregions of displayed video frames corresponding to disallowed video content with advertising when extracted filter codes match said criteria.

30. The device of claim 29 wherein said filter codes define the coordinates of the subregions within the video frames.

31. The device of claim 30 wherein the subregions are rectangular regions encompassing the disallowed video content.

* * * * *